US010942884B2

(12) United States Patent
Shao et al.

(10) Patent No.: US 10,942,884 B2
(45) Date of Patent: Mar. 9, 2021

(54) DUAL-EDGE TRIGGERED RING BUFFER AND COMMUNICATION SYSTEM

(71) Applicant: Radiawave Technologies Co., Ltd., Shenzhen (CN)

(72) Inventors: Yigao Shao, Shenzhen (CN); Yulin Tan, Shenzhen (CN); Jon Sweat Duster, Beaverton, OR (US); Ning Zhang, Shenzhen (CN); Haigang Feng, Shenzhen (CN)

(73) Assignee: Radiawave Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/759,626

(22) PCT Filed: Nov. 13, 2018

(86) PCT No.: PCT/CN2018/115238
§ 371 (c)(1),
(2) Date: Apr. 27, 2020

(87) PCT Pub. No.: WO2019/096128
PCT Pub. Date: May 23, 2019

(65) Prior Publication Data
US 2020/0278944 A1   Sep. 3, 2020

(30) Foreign Application Priority Data

Nov. 14, 2017   (CN) .......................... 201711125693.7

(51) Int. Cl.
*G06F 13/40*   (2006.01)
*G06F 11/16*   (2006.01)
*G06F 13/42*   (2006.01)

(52) U.S. Cl.
CPC ...... *G06F 13/4072* (2013.01); *G06F 11/1679* (2013.01); *G06F 13/4256* (2013.01)

(58) Field of Classification Search
CPC ............ G06F 13/4072; G06F 13/4256; G06F 11/1679
See application file for complete search history.

(56) References Cited

U.S. PATENT DOCUMENTS

2011/0292739 A1   12/2011   Song

FOREIGN PATENT DOCUMENTS

| CN | 1517883 A | 8/2004 |
|----|-----------|--------|
| CN | 1695305 A | 11/2005 |

(Continued)

OTHER PUBLICATIONS

First Office Action in counterpart Chinese Application 201711125693.7, dated Jun. 13, 2018.

(Continued)

*Primary Examiner* — Henry Tsai
*Assistant Examiner* — John B Roche
(74) *Attorney, Agent, or Firm* — Westbridge IP LLC

(57) ABSTRACT

The present disclosure provides a dual-edge triggered ring buffer and a communication system. The dual-edge triggered ring buffer includes a logic clock generation module and a data writing module. The logic clock generation module is configured to generate a corresponding first logic clock signal upon detecting an input of the trigger signal corresponding to the multiple first trigger signal input terminals, or to generate a corresponding second logic clock signal upon detecting an input of the trigger signal corresponding to the multiple second trigger signal input terminals. The data writing module is configured to write data output from the external system through the multiple corresponding input terminals according to the first logic clock signal or the second logic clock signal.

17 Claims, 5 Drawing Sheets

(56) References Cited

FOREIGN PATENT DOCUMENTS

| | | |
|---|---|---|
| CN | 101001228 A | 7/2007 |
| CN | 101097508 A | 1/2008 |
| CN | 102262900 A | 11/2011 |
| CN | 104380273 A | 2/2015 |
| CN | 107797956 A | 3/2018 |

OTHER PUBLICATIONS

International Search Report in corresponding PCT Application PCT/CN2018/115238, dated Jan. 30, 2019.

DUAL-EDGE TRIGGERED RING BUFFER AND COMMUNICATION SYSTEM

FIELD

The present application relates to the field of communication technology, and in particular to a dual-edge triggered ring buffer and a communication system.

BACKGROUND

When two systems are communicating, the clocks of the two systems may be out of sync. So a buffer zone is needed during a data transmission process. For example, a ring buffer is set to coordinate the data transmission process when the clocks of the two systems are not synchronized. A dual-edge triggered buffer is normally adopted to perform one data transmission at the rising and falling edges of the clock, to maximize the data transmission in each clock cycle.

However, in the development process of ASIC, the ring buffer should be configured to carefully arrange the relative relationship between each incoming data and the clock edge, or the register setup time may conflict with the register hold time, which complicating a timing of data transmission and bringing a synchronization issue.

SUMMARY

The main objective of the present disclosure is to provide a dual-edge triggered ring buffer and a communication system, aiming at reducing the timing complexity of data transmission of the register through a two-step data writing mode.

To realize the above objective, the present disclosure provides a dual-edge triggered ring buffer, which includes a logic clock generation module and a data writing module, the logic clock generation module comprising multiple first trigger signal input terminals, multiple second trigger signal input terminals and multiple logic clock signal output terminals, the multiple first trigger signal input terminals and the multiple second trigger signal input terminals of the logic clock generation module being configured to receive corresponding trigger signals, the multiple logic clock signal output terminals of the logic clock generation module being connected in one-to-one correspondence with multiple logic clock signal input terminals of the data writing module, and multiple input terminals of the data writing module being connected with an external system;

the logic clock generation module is configured to generate a corresponding first logic clock signal upon detecting an input of the trigger signal corresponding to the multiple first trigger signal input terminals, or to generate a corresponding second logic clock signal upon detecting an input of the trigger signal corresponding to the multiple second trigger signal input terminals; and the data writing module is configured to write data output from the external system through the multiple corresponding input terminals according to the first logic clock signal or the second logic clock signal.

In some embodiments, the logic clock generation module includes a first logic clock generation unit configured to generate the first logic clock signal and a second logic clock generation unit configured to generate the second logic clock signal, multiple signal input terminals of the first logic clock generation unit being the first trigger signal input terminals of the logic clock generation module, multiple signal input terminals of the second logic clock generation unit being the second trigger signal input terminals of the logic clock generation module, multiple output terminals of the first logic clock generation unit and the second logic clock generation unit being connected in one-to-one correspondence with multiple logic clock signal input terminals of the data writing module.

In some embodiments, the first logic clock generation unit includes multiple first logic clock generation sub-units, the multiple first logic clock generation sub-units being connected in series, multiple trigger terminals of the multiple first logic clock generation sub-units being configured to input a reset signal, a listening signal, and a first strobe signal, and output terminals of the multiple first logic clock generation sub-units being connected to the multiple logic clock signal input terminals of the data writing module.

In some embodiments, each of the first logic clock generation sub-units includes a first strobe, a second strobe, a third strobe and a first D trigger, an address input terminal of the first strobe being configured to input an address signal, a data input terminal of the first strobe being configured to input the first strobe signal, an input terminal of the first strobe being connected to an address input terminal of the second strobe, a data input terminal of the second strobe being configured to input the listening signal, an output terminal of the second strobe being connected to an address input terminal of the third strobe, a data input terminal of the third strobe being configured to input the reset signal, an output terminal of the third strobe being connected to an input terminal of the first D trigger, and an output terminal of the first D trigger being an output terminal of the first logic clock generation sub-unit.

In some embodiments, the second logic clock generation unit includes multiple second logic clock generation sub-units, the multiple second logic clock generation sub-units being arranged in series, multiple trigger terminals of the multiple second logic clock generation sub-units being configured to input a reset signal, a listening signal and a second strobe signal, and output terminals of the multiple second logic clock units being also connected to the logic clock signal input terminals of the data writing module.

In some embodiments, each of the second logic generation sub-units includes a fourth strobe, a fifth strobe, a sixth strobe, and a second D trigger, an address input terminal of the fourth strobe being configured to input an address signal, a data input terminal of the fourth strobe being configured to input a strobe signal, an input terminal of the fourth strobe being connected to an address input terminal of the fifth strobe, a data input terminal of the fifth strobe being configured to input a listening signal, an output terminal of the fifth strobe being connected to an address input terminal of the sixth strobe, a data input terminal of the sixth strobe being configured to input a reset signal, an output terminal of the sixth strobe being connected to an input terminal of the second D trigger, and an output terminal of the second D trigger being an output terminal of the second logic clock generation sub-unit.

In some embodiments, the data writing module includes multiple registers arranged in parallel, data input terminals of the multiple registers being connected to a data terminal of an external system, trigger terminals of the multiple registers being the logic clock signal input terminals of the data writing module, and output terminals of the multiple registers being output terminals of the data writing module.

In some embodiments, the dual-edge triggered ring buffer further includes a data reading module, multiple input terminals of the data reading module being connected in one-to-one correspondence with multiple output terminals of the data writing module, and an output terminal of the data writing module being configured to output corresponding data.

In some embodiments, the data reading module is a N−1 router, multiple data input terminals of the N−1 router being multiple input terminals of the data reading module, and an output terminal of the N−1 router being the output terminal of the data reading module.

The present disclosure further provides a communication system, which includes the dual-edge triggered ring buffer as described above. The dual-edge triggered ring buffer includes a logic clock generation module and a data writing module, the logic clock generation module comprising multiple first trigger signal input terminals, multiple second trigger signal input terminals and multiple logic clock signal output terminals, the multiple first trigger signal input terminals and the multiple second trigger signal input terminals of the logic clock generation module being configured to receive corresponding trigger signals, the multiple logic clock signal output terminals of the logic clock generation module being connected in one-to-one correspondence with multiple logic clock signal input terminals of the data writing module, and multiple input terminals of the data writing module being connected with an external system; the logic clock generation module is configured to generate a corresponding first logic clock signal upon detecting an input of the trigger signal corresponding to the multiple first trigger signal input terminals, or to generate a corresponding second logic clock signal upon detecting an input of the trigger signal corresponding to the multiple second trigger signal input terminals; and the data writing module is configured to write data output from the external system through the multiple corresponding input terminals according to the first logic clock signal or the second logic clock signal.

The dual-edge triggered ring buffer of present disclosure adopts a two-step data writing mode. A logic clock for the first step is generated through a logic clock generation module, then the logic clock signal generated by the logic clock generation module is configured to control the data writing module to write corresponding data according to the logic clock signal, so as to finish the write of data when next clock edge of each register in the data writing module comes. As such, the present disclosure solves the problem that it is prone to occur a conflict between the register setup time and the register hold time without a dual-edge trigger. Compared to an existing one-step data writing mode, the present disclosure reduces a timing complexity of data transmission of the register through a two-step data writing mode.

BRIEF DESCRIPTION OF THE DRAWINGS

In order to more clearly illustrate the embodiments of the present disclosure or the technical solutions in the related art, the drawings to be used in the embodiments or description of the related art will be briefly described below. Obviously, the drawings in the following description are only certain embodiments of the present disclosure, and other drawings may be obtained according to the structures shown in the drawings without any creative work for a person having ordinary skill in the art.

Figure 1:
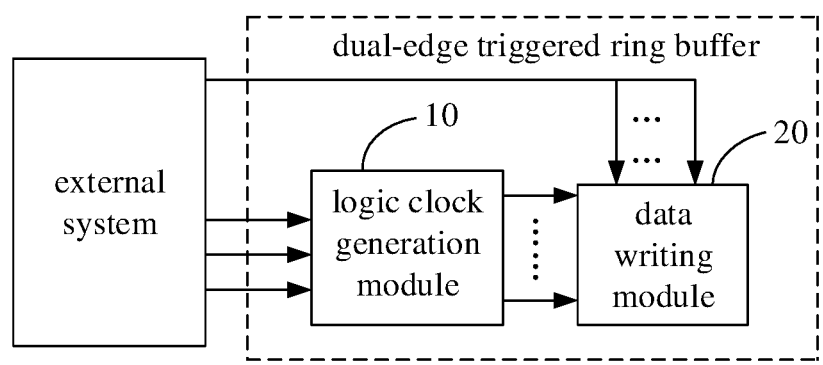
FIG. 1 is a schematic diagram of functional modules of a dual-edge triggered ring buffer, applied to a communication system, according to an embodiment of the present disclosure.

The implementation, functional features and advantages of the present disclosure will be further described with reference to the accompanying drawings.

DETAILED DESCRIPTION OF THE EMBODIMENTS

The technical solutions in the embodiments of the present disclosure are clearly and completely described in the following with reference to the drawings in the embodiments of the present disclosure. It is obvious that the described embodiments are only a part of the embodiments of the present disclosure, and not all of the embodiments. Based on the embodiments in this application, all other embodiments obtained by a person having ordinary skill in the art without making any creative work fall within the scope of this application.

It should be noted that all directional indications (such as up, down, left, right, front, rear, . . . ) in the embodiments of the present disclosure are only used to explain the relative position relationship, the movement, etc. between the components in a specific posture (as shown in the attached drawings). If the specific posture is changed, the directional indication will be changed accordingly.

In addition, the descriptions of "first", "second", etc., in this application are used for descriptive purposes only, and are not to be construed as indicating or implying their relative importance or implicitly indicating the number of technical features indicated. Thus, features defining "first" or "second" may include at least one of the features, either explicitly or implicitly. In addition, the technical solutions between the various embodiments of the present disclosure may be combined with each other, but must be based on the realization of a person having ordinary skill in the art, when the combination of technical solutions is contradictory or unrealizable, it shall be deemed that such combination of technical solutions does not exist and is not within the scope of this application.

The present disclosure provides a dual-edge triggered ring buffer, applied to a communication between two systems.

When two systems are communicating, the clocks of the two systems may be out of sync. So a buffer zone is needed during a data transmission process. For example, a ring buffer is adopted to coordinate the data transmission process when the two clocks are not synchronized. Dual-edge triggered buffer is normally adopted to perform one data transmission on the rising and falling edges of the clock, to maximize the data transmission in each clock cycle.

However, when one system is transferring data to another system, the system only enables a "listening signal" to the another system, to inform that it needs to write a data message at this time and to read data at every rising and falling edges. As such, the ring buffer should carefully arrange a relative relationship between each incoming data and the clock edge, so as to solve a conflict between the register setup time and the register hold time, as the conflict may complicate a timing of data transmission and bring a synchronization issue.

Figure 2:
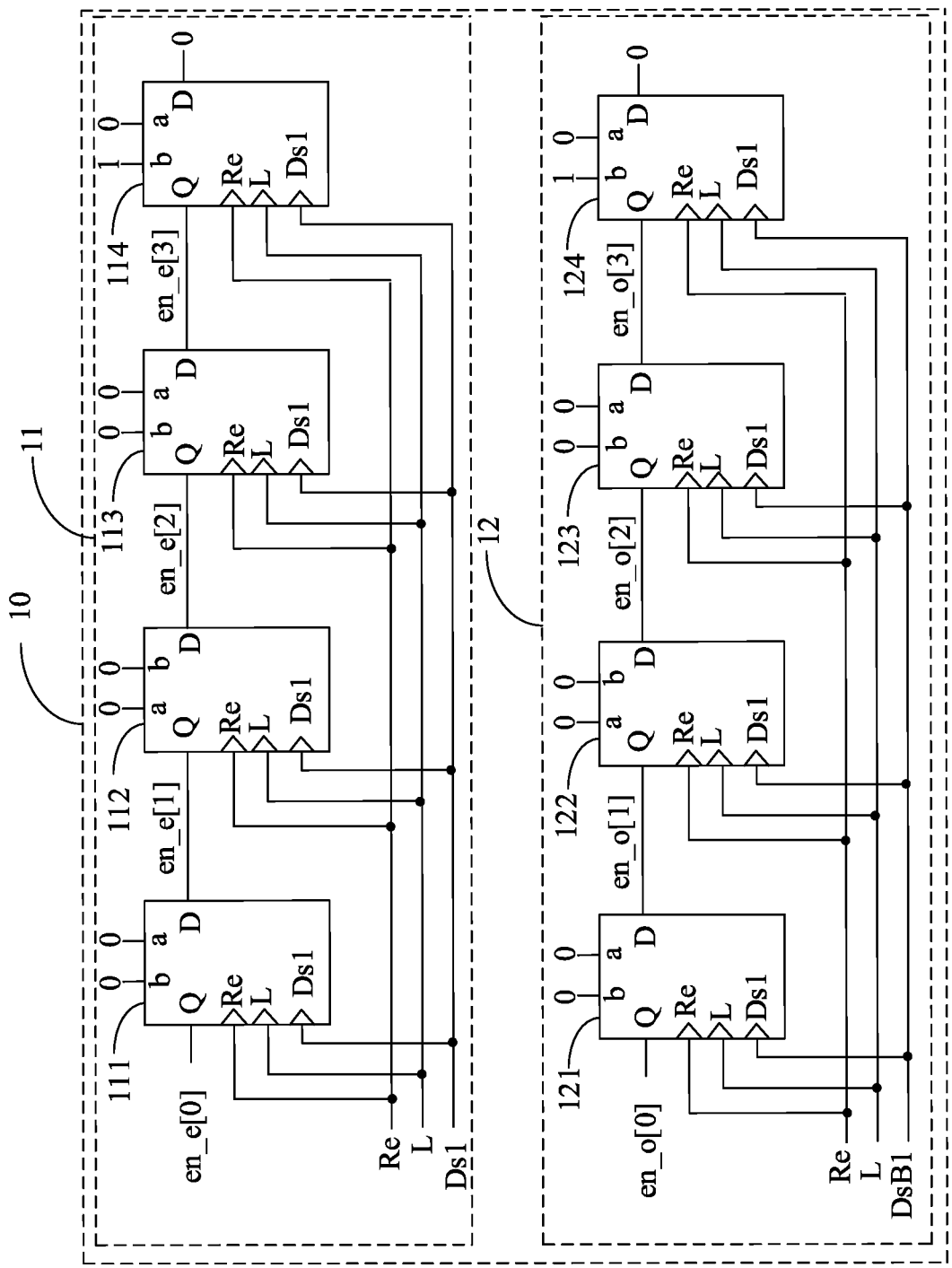
FIG. 2 is a schematic diagram of a circuit structure of a logic clock generation module in the dual-edge triggered ring buffer of FIG. 1.
Figure 3:
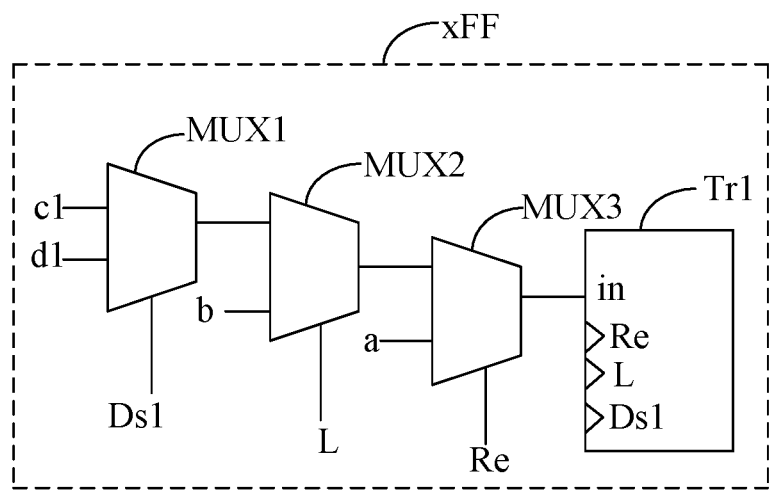
FIG. 3 is a schematic diagram of a circuit structure of a first logic clock generation unit of the logic clock generation module of FIG. 2.
Figure 4:
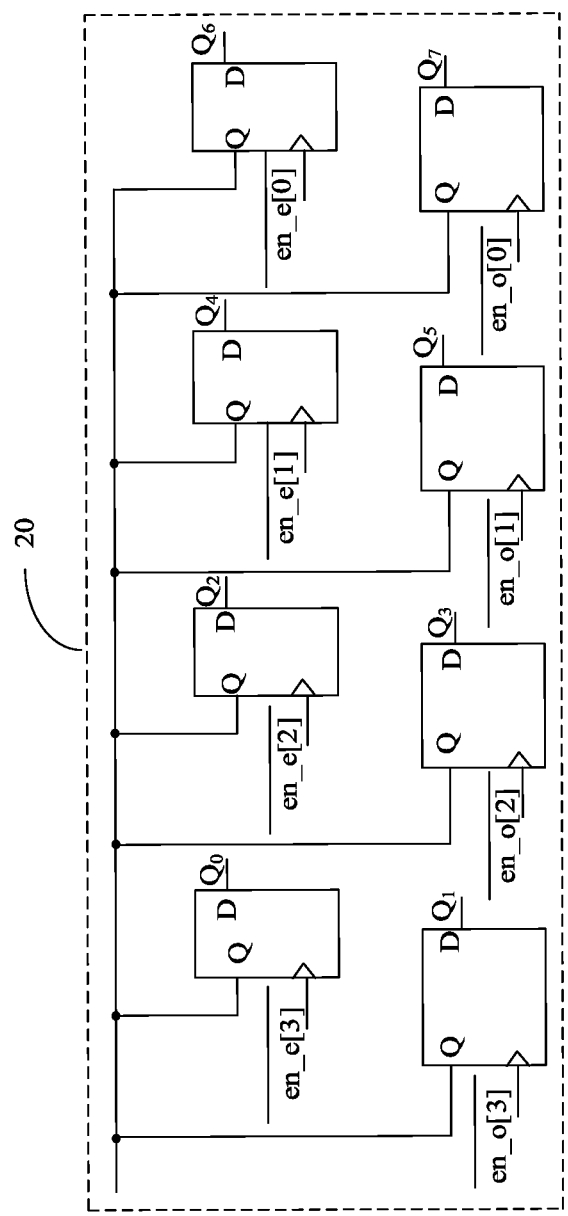
FIG. 4 is a schematic diagram of a circuit structure of a data writing module in the dual-edge triggered ring buffer of FIG. 1.
Figure 5:
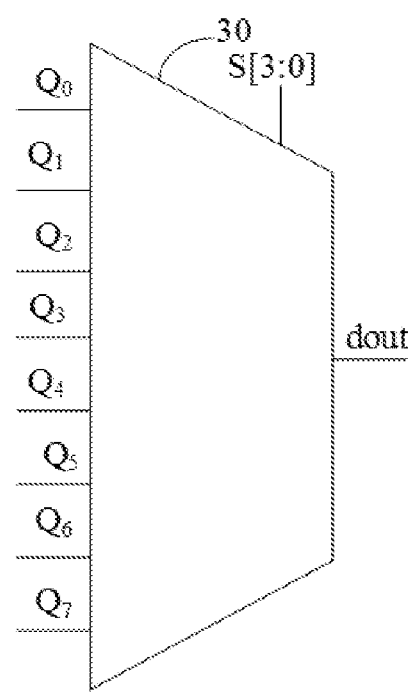
FIG. 5 is a schematic diagram of a circuit structure of a data reading module in the dual-edge triggered ring buffer of FIG. 1.

Referring to FIGS. 1 to 5, in one embodiment of the present disclosure, the dual-edge triggered ring buffer includes a logic clock generation module 10 and a data writing module 20. The logic clock generation module 10 includes multiple first trigger signal input terminals, multiple second trigger signal input terminals and multiple logic clock signal output terminals. The multiple first trigger signal input terminals and the multiple second trigger signal input terminals of the logic clock generation module are configured to receive corresponding trigger signals. The multiple logic clock signal output terminals of the logic clock generation module 10 are connected in one-to-one correspondence with multiple logic clock signal input terminals of the data writing module 20. Multiple input terminals of the data writing module 20 are connected with an external system.

The logic clock generation module 10 is configured to generate a corresponding first logic clock signal in response to detecting an input of the trigger signal corresponding to the multiple first trigger signal input terminals, or to generate a corresponding second logic clock signal in response to detecting an input of the trigger signal corresponding to the multiple second trigger signal input terminals.

The data writing module 20 is configured to write data output from the external system through the multiple corresponding input terminals according to the first logic clock signal or the second logic clock signal.

In the present embodiment, when one system needs to transmit data to another system, for example, when system A needs to transmit data to system B, system A may enable a "listening signal L" to system B, the trigger signal input terminal of the logic clock generation module 10 receives the "listening signal L" at this time. That is, when system A needs to write a data message, the logic clock generation module 10 generates a first logic clock signal when receiving a first strobe signal Ds1 sent by the system A, and generates a second logic clock signal when receiving a second strobe signal DsB1 (an inverse of Ds1) sent by the system A, and output the first logic clock signal and the second logic clock signal to the data writing module 20. The first strobe signal Ds1 is a high-level trigger signal, and the second strobe signal DsB1 is a low-level strobe signal. So that, the data writing module 20 may write data once in one clock cycle according to the first logic clock signal and the second logic clock signal.

The dual-edge triggered ring buffer of present disclosure adopts the two-step data writing mode. A logic clock for the first step is generated through the logic clock generation module 10, then the logic clock signal generated by the logic clock generation module 10 is configured to control the data writing module 20 to write corresponding data according to the logic clock signal, so as to finish the write of data when next clock edge of each register in the data writing module comes. As such, the present disclosure solves the problem that it is prone to occur a conflict between the register setup time and the register hold time without a dual-edge trigger. Compared to an existing one-step data writing mode, the present disclosure reduces a timing complexity of data transmission of the register through a two-step data writing mode.

Referring to FIGS. 1 to 5, the logic clock generation module 10 includes a first logic clock generation unit 11 configured to generate the first logic clock signal and a second logic clock generation unit 12 configured to generate the second logic clock signal. Multiple signal input terminals of the first logic clock generation unit 11 are the first trigger signal input terminals of the logic clock generation module 10. Multiple signal input terminals of the second logic clock generation unit 12 are the second trigger signal input terminals of the logic clock generation module 10. Multiple output terminals of the first logic clock generation unit 11 and the second logic clock generation unit 12 are connected in one-to-one correspondence with multiple logic clock signal input terminals of the data writing module 20.

In this embodiment, the system A enables a "listening signal L" to the system B. When the trigger signal input terminal of the logic clock generation module 10 receives the "listening signal L", or when the system A needs to write data information, the first logic generation unit is configured to generate the first logic clock signal when receiving the first strobe signal Ds1 from the system A, and the second logic generation unit is configured to generate the second logic clock signal when receiving the second strobe signal DsB1 from the system A. The first logic clock generation unit 11 and the second logic clock generation unit 12 output the first logic clock signal and the second logic clock signal to the data writing module 20 respectively, for controlling the logic module to write data.

Referring to FIGS. 1 to 5, the first logic clock generation unit 11 further includes multiple first logic clock generation sub-units (not labeled) connected in series. Multiple trigger terminals of the multiple first logic clock generation sub-units are configured to input a reset signal Re, a listening signal L, and a first strobe signal Ds1. Output terminals of the multiple first logic clock generation sub-units are also connected to the multiple logic clock signal input terminals of the data writing module 20.

In this embodiment, the quantity of first logic clock generation sub-units may be four, eight, or sixteen, preferably four in this embodiment, including a first one logic clock generation sub-unit 111, a first two logic clock generation sub-unit 112, a first three logic clock generation sub-unit 113, and a first four logic clock generation sub-unit 114. Three triggers of the first one logic clock generation sub-unit 111, three triggers of the first two logic clock generation sub-unit 112, three triggers of the first three logic clock generation sub-unit 113, and three triggers of the first four logic clock generation sub-unit 114 are configured to input the reset signal Re, the listening signal L, and the first strobe signal Ds1. The data input terminal of the first four logic clock generation sub-unit is configured to input the binary code '0', the data output terminal of the first four logic clock generation sub-unit 114 is connected to the data input terminal of the first three logic clock generation sub-unit 113, the data output terminal of the first three logic clock generation sub-units 113 is connected to the data input terminal of the first two logic clock generation sub-unit 112, and the data output terminal of the first two logic clock generation sub-units 112 is connected to the data input terminal of first one logic clock generation sub-unit 111. In this way, the output signal of the previous logic clock generation sub-unit is defined as the input signal of the following logic clock generation sub-unit, and the following logic clock generation sub-unit is triggered by the rising edge of any one of the reset signal Re, the listening signal L, and the first strobe signal Ds1, thereby inputting the signal into the following logic clock generation sub-unit. Two address input terminals of the first four logic clock generation sub-unit 114 are written with '01'. Two address input terminals of the first one logic clock generation sub-unit 111, two address input terminals of the first two logic clock generation sub-unit 112, two address input terminals of the first three logic clock generation sub-unit 113 are written to '00', respectively. As such, when the system A outputs the "listening signal L" each logic generation sub-unit outputs the level with one binary code of '1000', and when the system A receives the "first strobe signal Ds1" the signal corresponding to each logic generation sub-unit jumps to '0100', and so on. Each time one "first strobe signal Ds1" is received, the code is shifted, and the first strobe signal Ds1 here is at a high level signal. That is, the code shifts from '1000' to '0100', '0010', '0001', '0000' in sequence. After one code shift, the system A may output a high-level reset signal Re, to restore the binary codes corresponding to the levels output by the four first logic generation sub-units to '1000', and wait for a next trigger of the "listening signal L" input by the system A.

When the high-level signals of the four logic generation sub-units jump to low levels, that is, when the high-level signals jump from '1' to '0' and the logic clock signal is generated, the data writing module 20 is triggered to perform one data writing at the falling edge.

Referring to FIGS. 1 to 5, the first logic clock generation sub-unit includes a first strobe MUX1, a second strobe MUX2, a third strobe MUX3 and a first D trigger Tr1. Two address input terminals c1 and d1 of the first strobe MUX1 are configured to input address signals, a data input terminal of the first strobe MUX1 is configured to input the first strobe signal Ds1, an input terminal of the first strobe MUX1 is connected to an address input terminal of the second strobe MUX2, a data input terminal of the second strobe MUX2 is configured to input the listening signal L, an output terminal of the second strobe MUX2 is connected to an address input terminal of the third strobe MUX3, a data input terminal of the third strobe MUX3 is configured to input the reset signal Re, an output terminal of the third strobe MUX3 is connected to an input terminal of the first D trigger Tr1, and an output terminal of the first D trigger Tr1 is an output terminal of the first logic clock generation sub-unit xFF.

In this embodiment, the structures of the first logic generation sub-units xFF are the same, and are all implemented by three strobes and one D trigger. The first D trigger Tr1 is triggered at a rising edge, that is, the first D trigger Tr1 is triggered when any one of "reset signal Re", "listening signal L", "first strobe signal Ds1" is high level. The first strobe MUX1, the second strobe MUX2 and the third strobe MUX3 are configured to shift the code of the first logic generation sub-unit xFF. That is, the first D trigger Tr1 is triggered when receiving the "reset signal Re", "listening signal L" or "first strobe signal Ds1" output by the data input terminal.

Referring to FIGS. 1 to 5, the second logic clock generation unit 12 further includes multiple second logic clock generation sub-units, the multiple second logic clock generation sub-units are arranged in series. Output terminals of the multiple second logic clock units are also connected to the logic clock signal input terminals of the data writing module 20.

In this embodiment, the quantity of second logic clock generation sub-units may be four, eight, or sixteen, preferably four in this embodiment, including a second one logic clock generation sub-unit 121, a second two logic clock generation sub-unit 122, a second three logic clock generation sub-unit 123, and a second four logic clock generation sub-unit 124. Three triggers of the second one logic clock generation sub-unit 121, three triggers of the second two logic clock generation sub-unit 122, three triggers of the second three logic clock generation sub-unit 123, and three triggers of the second four logic clock generation sub-unit 124 are configured to input the reset signal Re, the listening signal L, and the second strobe signal DsB1. The data input terminal of the second four logic clock generation sub-unit 124 is configured to input the binary code '0', the data output terminal of the second four logic clock generation sub-unit 124 is connected to the data input terminal of the second three logic clock generation sub-unit, the data output terminal of the second three logic clock generation sub-units 123 is connected to the data input terminal of the second two logic clock generation sub-unit 122, and the data output terminal of the second two logic clock generation sub-units 122 is connected to the data input terminal of second one logic clock generation sub-unit 121. In this way, the output signal of the previous logic clock generation sub-unit is defined as the input signal of the following logic clock generation sub-unit, and the following logic clock generation sub-unit is triggered by the rising edge of any one of the reset signal Re, the listening signal L, and the second strobe signal DsB1, thereby inputting the signal into the following logic clock generation sub-unit. For example, when the system A outputs the "Listening signal L", the binary code corresponding to the levels output by the four logic generation sub-units at this time is defined as '1000'; when one "second strobe signal DsB1" is received, the signals corresponding to the four logic generation sub-units jump to '0100', and so on. Each time one "first strobe signal Ds1" is received, the code is shifted, and the first strobe signal Ds1 here is at a high level signal. That is, the code shifts from '1000' to '0100', '0010', '0001', '0000' in sequence. After one code shift, the system A may output a high-level reset signal Re, to restore the binary codes corresponding to the levels output by the four first logic generation sub-units xFF to '1000', and wait for a next trigger of the "listening signal L" input by the system A.

When the high-level signals of the four logic generation sub-units jump to low levels, that is, when the high-level signals jump from '1' to '0' and the logic clock signal is generated, the data writing module 20 is triggered to perform one data writing at the falling edge.

Referring to FIGS. 1 to 5, the second logic generation sub-unit further includes a fourth strobe, a fifth strobe, a sixth strobe, and a second D trigger. An address input terminal of the fourth strobe is configured to input an address signal, a data input terminal of the fourth strobe is configured to input a strobe signal, and an input terminal of the fourth strobe is connected to an address input terminal of the fifth strobe. A data input terminal of the fifth strobe is configured to input a listening signal, an output terminal of the fifth strobe is connected to an address input terminal of the sixth strobe. A data input terminal of the sixth strobe is configured to input a reset signal, an output terminal of the sixth strobe is connected to an input terminal of the second D trigger, and an output terminal of the second D trigger is an output terminal of the second logic clock generation sub-unit.

It would be noted that the structure of the second logic generation sub-unit is the same as that of the first logic generation sub-unit, and the first and second logic generation sub-unit are all implemented by three strobes and a D trigger. The first logic generation sub-unit is triggered by the rising edge clock, and the second logic generation sub-unit is triggered by the falling edge clock. It would be understood that, since the structure of the second logic generation sub-unit is the same as that of the first logic generation sub-unit, the working principles and the achieved technical effects of the first and second logic generation sub-unit are also the same, respectively. For details, the working principle and the achieved technical effect of the second logic generation sub-unit may be referred to those of the first logic generation sub-unit, which will not be repeated here.

Referring to FIGS. 1 to 5, in some embodiments, the data writing module 20 includes multiple registers (not labeled) arranged in parallel, data input terminals of the multiple registers are connected to a data terminal of an external system, trigger terminals of the multiple registers are the logic clock signal input terminals of the data writing module 20, and output terminals of the multiple registers are output terminals (Q0~Q7) of the data writing module 20.

In this embodiment, the quantity of the registers is eight, and each register is triggered by the falling edge logic clock signal output by the logic clock generation module 10. In this way, each register may be triggered when receiving the logic clock signal, and the data from the external system is written into corresponding register. Each falling edge logic clock signal is configured to trigger a corresponding register to write data. As such, the conflict between the register setup time and the register hold time in the buffer may be avoided. Of course, in other embodiments, the quantity of the registers may be 16, 32, etc., which is not limited herein.

Referring to FIGS. 1 to 5, based on the above embodiments, the dual-edge triggered ring buffer further includes a data reading module 30, multiple input terminals of the data reading module 30 are connected in one-to-one correspondence with multiple output terminals (Q0 to Q7) of the data writing module 20, and an output terminal dout of the data writing module 30 is configured to output corresponding data.

In this embodiment, the data reading module 30 is preferably implemented by a N–1 router. Multiple data input terminals of the N–1 router are multiple input terminals of the data reading module 30, and an output terminal of the N–1 router is the output terminal of the data reading module 30.

In this embodiment, the N–1 router is preferably an 8-1 router, and eight input terminals of the 8-1 router are connected to eight registers in the data reading module 30 respectively. So that the corresponding register reads the corresponding data according to the address code input from the address input terminal when writing data. Of course, in other embodiments, the N–1 router may also be a 16-1 router, or a 12-1 router, etc., which may be specifically set according to the requirements of the system, and is not limited herein.

The present disclosure also provides a communication system including the dual-edge triggered ring buffer as described above. As the detailed structure of the dual-edge triggered ring buffer may be referred in the above embodiments, no need to repeat again. It may be understood that, as the above-mentioned dual-edge triggered ring buffer is applied in the communication system of the present disclosure, the embodiments of the communication system of the present disclosure include all the technical solutions of all the embodiments of the dual-edge triggered ring buffer as described above, and achieve the same technical effects, no need to repeat again.

The above are only preferred embodiments of the present disclosure, and thus do not limit the scope of the present disclosure. Any equivalent structure or equivalent process transformation made by using the description and drawings of the present disclosure is included in the scope of the present disclosure.

We claim:

1. A dual-edge triggered ring buffer, wherein the dual-edge triggered ring buffer comprises a logic clock generation module and a data writing module, the logic clock generation module comprising multiple first trigger signal input terminals, multiple second trigger signal input terminals and multiple logic clock signal output terminals, the multiple first trigger signal input terminals and the multiple second trigger signal input terminals of the logic clock generation module being configured to receive corresponding trigger signals, the multiple logic clock signal output terminals of the logic clock generation module being connected in one-to-one correspondence with multiple logic clock signal input terminals of the data writing module, and multiple input terminals of the data writing module being connected with an external system; and, wherein, the logic clock generation module is configured to generate a corresponding first logic clock signal upon detecting an input of the trigger signal corresponding to the multiple first trigger signal input terminals, or to generate a corresponding second logic clock signal upon detecting an input of the trigger signal corresponding to the multiple second trigger signal input terminals; and the data writing module is configured to write data output from the external system through the multiple corresponding input terminals according to the first logic clock signal or the second logic clock signal.

2. The dual-edge triggered ring buffer of claim 1, wherein the logic clock generation module comprises a first logic clock generation unit configured to generate the first logic clock signal and a second logic clock generation unit configured to generate the second logic clock signal, multiple signal input terminals of the first logic clock generation unit being the first trigger signal input terminals of the logic clock generation module, multiple signal input terminals of the second logic clock generation unit being the second trigger signal input terminals of the logic clock generation module, multiple output terminals of the first logic clock generation unit and the second logic clock generation unit being connected in one-to-one correspondence with multiple logic clock signal input terminals of the data writing module.

3. The dual-edge triggered ring buffer of claim 2, wherein the first logic clock generation unit comprises multiple first logic clock generation sub-units, the multiple first logic clock generation sub-units being connected in series, multiple trigger terminals of the multiple first logic clock generation sub-units being configured to input a reset signal, a listening signal, and a first strobe signal, and output terminals of the multiple first logic clock generation sub-units being connected to the multiple logic clock signal input terminals of the data writing module.

4. The dual-edge triggered ring buffer of claim 3, wherein each of the first logic clock generation sub-units comprises a first strobe, a second strobe, a third strobe and a first D trigger, an address input terminal of the first strobe being configured to input an address signal, a data input terminal of the first strobe being configured to input the first strobe signal, an input terminal of the first strobe being connected to an address input terminal of the second strobe, a data input terminal of the second strobe being configured to input the listening signal, an output terminal of the second strobe being connected to an address input terminal of the third strobe, a data input terminal of the third strobe being configured to input the reset signal, an output terminal of the third strobe being connected to an input terminal of the first D trigger, and an output terminal of the first D trigger being an output terminal of the first logic clock generation sub-unit.

5. The dual-edge triggered ring buffer of claim 2, wherein the second logic clock generation unit comprises multiple second logic clock generation sub-units, the multiple second logic clock generation sub-units being arranged in series, multiple trigger terminals of the multiple second logic clock generation sub-units being configured to input a reset signal, a listening signal and a second strobe signal, and output terminals of the multiple second logic clock units being connected to the logic clock signal input terminals of the data writing module.

6. The dual-edge triggered ring buffer of claim 5, wherein each of the second logic generation sub-units comprises a fourth strobe, a fifth strobe, a sixth strobe, and a second D trigger, an address input terminal of the fourth strobe being configured to input an address signal, a data input terminal of the fourth strobe being configured to input a strobe signal, an input terminal of the fourth strobe being connected to an address input terminal of the fifth strobe, a data input terminal of the fifth strobe being configured to input a listening signal, an output terminal of the fifth strobe being connected to an address input terminal of the sixth strobe, a data input terminal of the sixth strobe being configured to input a reset signal, an output terminal of the sixth strobe being connected to an input terminal of the second D trigger, and an output terminal of the second D trigger being an output terminal of the second logic clock generation sub-unit.

7. The dual-edge triggered ring buffer of claim 1, wherein the data writing module comprises multiple registers arranged in parallel, data input terminals of the multiple registers being connected to a data terminal of an external system, trigger terminals of the multiple registers being the logic clock signal input terminals of the data writing module, and output terminals of the multiple registers being output terminals of the data writing module.

8. The dual-edge triggered ring buffer of claim 1, wherein the dual-edge triggered ring buffer further comprises a data reading module, multiple input terminals of the data reading module being connected in one-to-one correspondence with multiple output terminals of the data writing module, and an output terminal of the data writing module being configured to output corresponding data.

9. The dual-edge triggered ring buffer of claim 8, wherein the data reading module is a N−1 router, multiple data input terminals of the N−1 router being the multiple input terminals of the data reading module, and an output terminal of the N−1 router being the output terminal of the data reading module.

10. A communication system, comprising a dual-edge triggered ring buffer of claim 1.

11. The communication system of claim 10, wherein the logic clock generation module comprises a first logic clock generation unit configured to generate the first logic clock signal and a second logic clock generation unit configured to generate the second logic clock signal, multiple signal input terminals of the first logic clock generation unit being the first trigger signal input terminals of the logic clock generation module, multiple signal input terminals of the second logic clock generation unit being the second trigger signal input terminals of the logic clock generation module, multiple output terminals of the first logic clock generation unit and the second logic clock generation unit being connected in one-to-one correspondence with multiple logic clock signal input terminals of the data writing module.

12. The communication system of claim 11, wherein the first logic clock generation unit comprises multiple first logic clock generation sub-units, the multiple first logic clock generation sub-units being connected in series, multiple trigger terminals of the multiple first logic clock generation sub-units being configured to input a reset signal, a listening signal, and a first strobe signal, and output terminals of the multiple first logic clock generation sub-units being connected to the multiple logic clock signal input terminals of the data writing module.

13. The communication system of claim 12, wherein each of the first logic clock generation sub-units comprises a first strobe, a second strobe, a third strobe and a first D trigger, an address input terminal of the first strobe being configured to input an address signal, a data input terminal of the first strobe being configured to input the first strobe signal, an input terminal of the first strobe being connected to an address input terminal of the second strobe, a data input terminal of the second strobe being configured to input the listening signal, an output terminal of the second strobe being connected to an address input terminal of the third strobe, a data input terminal of the third strobe being configured to input the reset signal, an output terminal of the third strobe being connected to an input terminal of the first D trigger, and an output terminal of the first D trigger being an output terminal of the first logic clock generation sub-unit.

14. The communication system of claim 11, wherein the second logic clock generation unit comprises multiple second logic clock generation sub-units, the multiple second logic clock generation sub-units being arranged in series, multiple trigger terminals of the multiple second logic clock generation sub-units being configured to input a reset signal, a listening signal and a second strobe signal, and output terminals of the multiple second logic clock units being also connected to the logic clock signal input terminals of the data writing module.

15. The communication system of claim 14, wherein each of the second logic generation sub-units comprises a fourth strobe, a fifth strobe, a sixth strobe, and a second D trigger, an address input terminal of the fourth strobe being configured to input an address signal, a data input terminal of the fourth strobe being configured to input a strobe signal, an input terminal of the fourth strobe being connected to an address input terminal of the fifth strobe, a data input terminal of the fifth strobe being configured to input a listening signal, an output terminal of the fifth strobe being connected to an address input terminal of the sixth strobe, a data input terminal of the sixth strobe being configured to input a reset signal, an output terminal of the sixth strobe being connected to an input terminal of the second D trigger, and an output terminal of the second D trigger being an output terminal of the second logic clock generation sub-unit.

16. The communication system of claim 10, wherein the data writing module comprises multiple registers arranged in parallel, data input terminals of the multiple registers being connected to a data terminal of an external system, trigger terminals of the multiple registers being the logic clock signal input terminals of the data writing module, and output terminals of the multiple registers being output terminals of the data writing module.

17. The communication system of claim 10, wherein the dual-edge triggered ring buffer further comprises a data reading module, multiple input terminals of the data reading module being connected in one-to-one correspondence with multiple output terminals of the data writing module, and an output terminal of the data writing module being configured to output corresponding data.

* * * * *